US012718283B2

(12) United States Patent
Suzuki

(10) Patent No.: US 12,718,283 B2
(45) Date of Patent: Aug. 25, 2026

(54) MERCHANDISE RECOGNITION SYSTEMS

(71) Applicant: Toshiba Tec Kabushiki Kaisha, Tokyo (JP)

(72) Inventor: Yuki Suzuki, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 213 days.

(21) Appl. No.: 18/532,675

(22) Filed: Dec. 7, 2023

(65) Prior Publication Data

US 2024/0346570 A1 Oct. 17, 2024

(30) Foreign Application Priority Data

Apr. 17, 2023 (JP) ................................ 2023-067222

(51) Int. Cl.
*G06Q 30/0601* (2023.01)

(52) U.S. Cl.
CPC ................................ *G06Q 30/0633* (2013.01)

(58) Field of Classification Search
CPC ....................................... G06Q 30/0633–0637
See application file for complete search history.

(56) References Cited

U.S. PATENT DOCUMENTS

2014/0214596 A1* 7/2014 Acker, Jr. .......... G06Q 30/0633 705/26.8
2016/0109281 A1* 4/2016 Herring ............. G06Q 30/0235 177/1
2020/0005385 A1* 1/2020 Stout .................. G06Q 30/0633
2021/0177163 A1* 6/2021 Cohn ..................... G06Q 20/18
2022/0358817 A1* 11/2022 Bronicki .............. G07G 1/0072
2023/0140194 A1* 5/2023 Kadry .................. G06Q 50/265 705/7.15
2023/0143479 A1* 5/2023 Hagen ........................ G06T 7/11 345/420
2023/0146179 A1* 5/2023 Hagen ................ G06Q 30/0609 705/26.35

FOREIGN PATENT DOCUMENTS

JP 2020021378 A 2/2020
JP 2021087578 A 6/2021

OTHER PUBLICATIONS

Wang, Y.C., et al., "3S-cart: A Lightweight, Interactive Sensor-Based Cart for Smart Shopping in Supermarkets," in IEEE Sensors Journal, vol. 16, No. 17, pp. 6774-6781, Sep. 1, 2016, doi: 10.1109/JSEN.2016.2586101. (Year: 2016).*
Japanese Office Action dated Jan. 20, 2026, mailed in counterpart Japanese Application No. 2023-067222, 8 pages.

* cited by examiner

*Primary Examiner* — Victoria E. Frunzi
*Assistant Examiner* — Katherine A Barlow
(74) *Attorney, Agent, or Firm* — Kim & Stewart LLP

(57) ABSTRACT

According to one embodiment, a merchandise recognition system includes a processor and storage device to store an item upper limit value. The processor is configured to receive images of a shopping cart basket area via an interface, recognize merchandise items being moved into the shopping cart basket area in a received image, compare the item upper limit value to the number of merchandise items recognized as being moved into the shopping cart basket area in the received image, and issue a limit notification when the number of merchandise items recognized as being moved into the shopping cart basket area in the received image is greater than or equal to the item upper limit value.

12 Claims, 7 Drawing Sheets

71
711 PROCESSOR
712 MAIN MEMORY
713 AUXILIARY MEMORY DEVICE
7131 TERMINAL PROGRAM
71311 NUMBER-OF-ITEMS -LOADED UPPER LIMIT VALUE
7132 LEARNING DATA
714 WIRELESS UNIT
715 TOUCH PANEL
716 SPEAKER
717
READER 72
CAMERA 73
LED LAMP 731
ROTARY BEACON LIGHT 74
7

FIG. 6

MERCHANDISE RECOGNITION SYSTEMS

CROSS-REFERENCE TO RELATED APPLICATION

This application is based upon and claims the benefit of priority from Japanese Patent Application No. 2023-067222, filed Apr. 17, 2023, the entire contents of which are incorporated herein by reference.

FIELD

Embodiments described herein relate generally to a merchandise recognition system.

BACKGROUND

A cart point-of-sales (POS) system ("cart-based POS system") for retail stores with shopping carts has been proposed. For such a cart-based POS system, an information terminal having a touch panel and a scanner or the like is provided on a shopping cart. A customer using the shopping cart causes the scanner to read an identification code of a merchandise item which the user wishes to purchase and thus preforms merchandise registration. The scanning of the item can occur when the merchandise to be purchased is being placed in the shopping cart. In this way, the cart POS system allows the user to perform merchandise registration while shopping and therefore can reduce congestion in a payment area ("checkout area") of the store.

With the recent advancements in artificial intelligence (AI), there have been attempts to incorporate AI into the cart POS system. Such techniques may be referred to as a "frictionless cart," an "AI cart," a "smart cart," an "intelligent cart" or the like. In such systems, the user simply loads a merchandise item into the cart, the type of the merchandise item loaded in the cart is then automatically recognized and identified, based on AI-based image recognition of the merchandise item, and merchandise registration can be automatically executed without requiring the customer use the scanner to register the item or like. That is, the user need not specifically cause a scanner to read the identification code of the merchandise item to be purchased.

In such a cart POS system using AI, typically if a single merchandise item is loaded into the cart a time, merchandise registration can be performed at a relatively high probability.

However, if more than one merchandise item is loaded into the cart simultaneously (or nearly so), there may be a problem with product identification accuracy based on the image of the merchandise items. Generally, the accuracy of identification of each merchandise item drops significantly when multiple are present. Therefore, in some cases, the degree of reliability of merchandise registration is not sufficient for store operations.

BRIEF DESCRIPTION OF THE DRAWINGS

FIG. 6 shows a second part of the flowchart of information processing executed according to a terminal program by a processor of an information processing device in an information terminal.

DETAILED DESCRIPTION

An embodiment described herein provides a merchandise recognition system that enables an improved merchandise registration process that provides higher specifying reliability when using AI-based image recognition.

In general, according to one embodiment, a merchandise recognition system includes a processor and storage device to store an item upper limit value. The processor is configured to receive images of a cart basket area via an interface, recognize merchandise items being moved into the cart basket area in a received image, compare the item upper limit value to the number of merchandise items recognized as being moved into the cart basket area in the received image, and issue a limit notification when the number of merchandise items recognized as being moved into the cart basket area in the received image is greater than or equal to the item upper limit value.

Certain example embodiments of a merchandise recognition system will now be described using the drawings. The embodiments described below in the specific examples is for a case in which the recognition system is applied to a cart-based POS system.

First Embodiment

Figure 1:
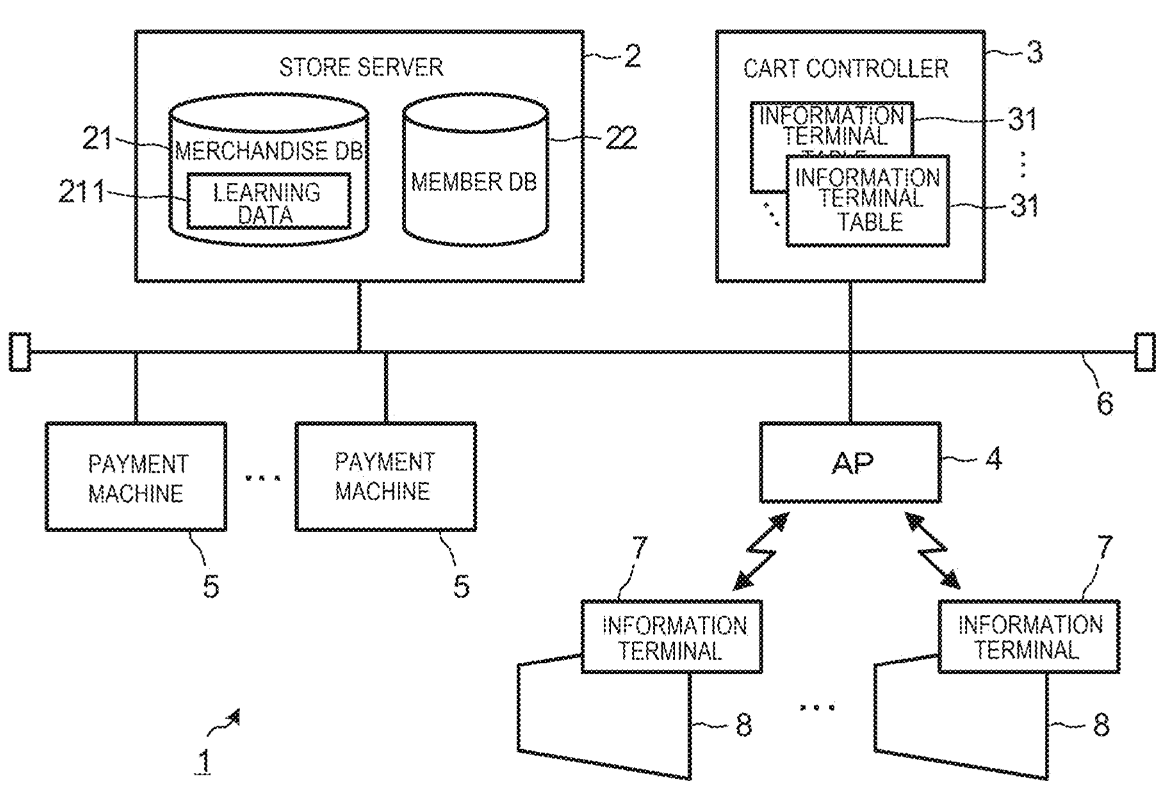
FIG. 1 shows an overall configuration of a cart POS system to which a merchandise recognition system according to a first embodiment is applied.

FIG. 1 shows an overall configuration of a cart POS system 1 to which a merchandise recognition system according to a first embodiment is applied. The cart POS system 1 includes a store server 2, a cart controller 3, an access point (AP) 4, and a payment machine 5. The store server 2, the cart controller 3, the access point 4, and the payment machine 5 are connected to a network 6 such as a LAN (local area network) or a wireless LAN. The cart POS system 1 includes a plurality of information terminals 7 connected to the network 6 via the access point 4.

The information terminal 7 is a device that enables a customer to input data for the registration of a merchandise item to be purchased by self-service. The information terminal 7 is provided on a shopping cart 8 used by a customer when shopping in the store. Hereinafter, the shopping cart 8 is simply referred to as the cart 8. Each of the carts 8 is provided with an information terminal 7. The cart 8 is an example of a carrier that carries the merchandise item(s) being purchased by the customer.

The information terminal 7 is mounted to the cart 8, for example. The information terminal 7 functions as a user interface for operations related to the registration of a merchandise item to be purchased. The information terminal 7 has a wireless unit. The information terminal 7 performs wireless communication with the access point 4. The access point 4 relays as appropriate the communication between the various devices connected to the network 6, that is, the store server 2, the cart controller 3, and the payment machine 5 on one hand, and the information terminal 7 on the other. While only one access point 4 is shown in FIG. 1, two or more access points 4 may be provided, depending on the physical size of the store or the like.

A payment machine 5 is a device that enables a salesclerk or a customer to make a payment for a merchandise item. The payment machine 5 may be a known type of a self-service POS terminal. The payment machine 5 may be a known type of a staffed POS terminal. The number of payment machines 5 is not particularly limited.

The store server 2 supports store operations. The store server 2 for the support manages a merchandise database (DB) 21, a member database (DB) 22, or the like.

The merchandise database 21 stores a merchandise record that describes merchandise data on a per merchandise item basis for each merchandise item type for sale at the store. The merchandise record includes a merchandise code, a price, a merchandise name, and the like. The merchandise code is the identification code of a merchandise item. A sales database saves a sales record that describes sales data on a per entry item basis such as merchandise item, category, time bracket, date, week, month, and the like. The sales data includes the number of items sold, the amount of sales, and the like.

In this present embodiment, the merchandise database 21 stores learning data 211 that has been provided in advance in order for AI to recognize the merchandise items saved in the merchandise database 21. The learning data 211 is an aggregate of learning data kept on a per merchandise item type basis for each merchandise item being put on sale at the store. The learning data for each merchandise item type is incorporated in the learning data 211 in correlation with a merchandise code. With any update of the merchandise database 21 in response to an addition or replacement of a merchandise item on sale at the store, the learning data 211 can be updated. The learning data for each merchandise item may be generated by the provider of the merchandise item or provided by the store. In some instances, the learning data for an item may be generated uniquely by the store. In the learning data 211, data about other things besides merchandise items, such as data about a person's hand, may be included as well.

The member database 22 saves a member record with member data for each member. The member data includes a member ID, a name, a gender, an email address, and the like. The member ID is a code such as a member number that is set on a per member basis in order to identify each individual member. A member may have a recording medium with the member ID recorded thereon. The recording medium is, for example, a magnetic card, a contact-type IC (integrated circuit) card, a contactless IC card, a smartphone, or the like.

The store server 2 may also manage a member settlement database, though such is not particularly illustrated. The member settlement database saves a member settlement record that describes the necessary data for the payment of a price, on a per member basis. The member settlement record may include an electronic money identification code and an electronic money user ID. In the cart POS system 1 according to this embodiment, the payment method available to a member who does not use the payment machine 5 is limited to one type, that is, electronic money payment. The electronic money identification code is the identification code of an electronic money account or the like registered in advance to be used by the member for the payment of a price. The electronic money user ID is an identification code for an electronic money center EMC to identify the user of the electronic money and is generally assigned by the electronic money center EMC. The member registers the electronic money identification code and the electronic money user ID in advance, for example, at the time of member registration, in order to enable payments by electronic money. If the registration for electronic money is not performed in advance, a value of NULL or 0000 is stored as the electronic money identification code and the electronic money user ID in the member settlement record. If the use of electronic money is enabled, the store server 2 has the function of a communication server or, alternatively, the cart POS system 1 additionally includes a communication server. The store server 2 or the communication server supports data communication processing executed via an external communication network such as the internet or a dedicated network for electronic money, between the payment machine 5 or the cart controller 3 and the electronic money center supporting the settlement by electronic money.

Figure 2:
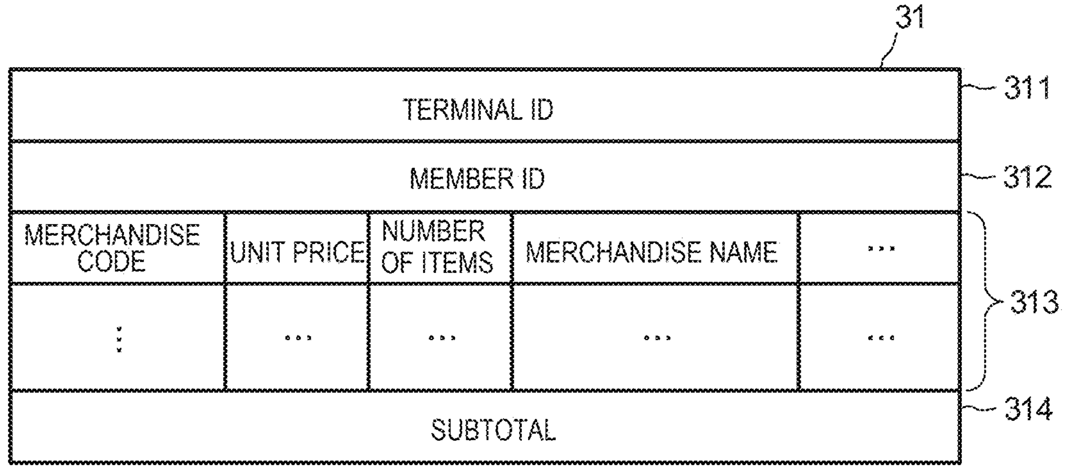
FIG. 2 is a schematic view showing a main data structure of an information terminal table of a mobile controller.

The cart controller 3 cooperates with the information terminal 7 and gives support so that the information terminal 7 appears to be functioning as a POS terminal. The cart controller 3 has an information terminal table 31 for each information terminal 7. FIG. 2 is a schematic view showing an example of an information terminal table 31. As shown in FIG. 2, the information terminal table 31 includes a terminal ID area 311, a member ID area 312, one or a plurality of merchandise-item-to-be-purchased data areas 313, and a subtotal area 314. The terminal ID area 311 stores a terminal ID, which is a code such as a terminal number to uniquely identify the specific information terminal 7 to which the information terminal table 31 corresponds. The member ID area 312 stores a member ID. The merchandise-item-to-be-purchased data area 313 stores merchandise-item-to-be-purchased data about the item(s) to be purchased by the customer. Such information is updated each time the customer registers a merchandise item with the information terminal 7. The merchandise-item-to-be-purchased data includes the merchandise code, the unit price, the number of items of the same type/code being sold (number of items), the merchandise name, and other information such as the amount of sales (extended price), the amount of tax due, and the like. The subtotal area 314 is summed amount data representing the total of the amount of sales and/or the amount of tax for all the merchandise items to be purchased by the customer based on the merchandise-item-to-be-purchased data stored in the merchandise-item-to-be-purchased data area 313. These values can be updated every time the customer performs a registration operation on a merchandise item to be purchased.

Figures 3, 4:
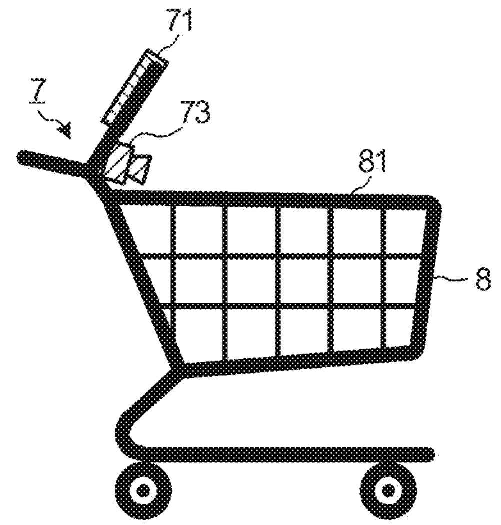
FIG. 3 is a block diagram of an information terminal.
FIG. 4 is a schematic view showing a position of installation of an information terminal on a shopping cart.

FIG. 3 is a block diagram showing a configuration of the information terminal 7. FIG. 4 is a schematic view showing the position of installation of the information terminal 7 on the cart 8. The information terminal 7 includes an information processing device 71, a reader 72, and a camera 73. The information processing device 71 may be a dedicated special-purpose device or may be a general-purpose device such as a tablet-type computer operating special-purpose software. The information processing device 71 has a processor 711, a main memory 712, an auxiliary memory device 713, a wireless unit 714, a touch panel 715, a speaker 716, and a system transmission line 717. The system transmission line 717 includes an address bus, a data bus, a control signal line, or the like. In the information processing device 71, the processor 711, the main memory 712, the auxiliary memory device 713, the wireless unit 714, the touch panel 715, and the speaker 716 are connected to the system transmission line 717. The reader 72 and the camera 73 can be connected to the system transmission line 717 via an interface or the like. In the information processing device 71, the processor 711, the main memory 712, the auxiliary memory device 713, and the system transmission line 717 connecting these components, together form a computer.

The processor 711 controls each part in order to implement various functions as the information processing device 71 according an operating system or an application program. The processor 711 is, for example, a CPU (central processing unit) but is not limited to this. The processor 711 may be a multicore or multithreading-type and may execute a plurality of processes in parallel. The processor 711 can also include an AI chip specialized in artificial intelligence (AI) operations. The processor 711 may also be implemented in various other forms including an integrated circuit such as a GPU (graphics processing unit), an ASIC (application-specific integrated circuit), an FPGA (field-programmable gate array), or a DSP (digital signal processor).

The main memory 712 includes a non-volatile memory area and a volatile memory area. The main memory 712 stores an operating system or an application program in the non-volatile memory area. In some cases, the main memory 712 may store necessary data for the processor 711 to execute processing to control each part, in the non-volatile or volatile memory area. In the main memory 712, the volatile memory area is used as a work area where the processor 711 rewrites data according to need. The non-volatile memory area is, for example, a ROM (read-only memory). The volatile memory area is, for example, a RAM (random-access memory).

For example, an EEPROM® (electrically erasable programmable read-only memory), an HDD (hard disk drive), or an SSD (solid-state drive) or the like can be the auxiliary memory device 713. The auxiliary memory device 713 saves data used by the processor 711 to perform various processing or data generated as a result of processing by the processor 711, or the like. In some cases, the auxiliary memory device 713 may store the application program.

In this embodiment, a terminal program 7131 configured to cause the information processing device 71, the reader 72, and the camera 73 to function as the information terminal 7 according to an embodiment is saved as an application program. The terminal program 7131 includes number-of-items-loaded upper limit value data 71311 setting an upper limit value on the number of merchandise items that can be loaded simultaneously. The terminal program 7131 may be stored in the main memory 712. The auxiliary memory device 713 also stores learning data 7132 used for AI-based merchandise recognition of each merchandise item sold at the store in the merchandise database 21 of the store server 2. The learning data 7132 may be a copy of the learning data 211 included in the merchandise database 21 of the store server 2. The timing for copying the learning data 211 to be used as the learning data 7132 may be a particular time, such as every time the information processing device 71 is started up, or may be any time. For example, the learning data 211 may be distributed from the store server 2 to the information processing device 71 whenever an update of the learning data 211 occurs.

The wireless unit 714 wirelessly communicates data to and from the access point 4 in conformity with a wireless communication protocol.

The touch panel 715 is a device that serves as both an input device and a display device of the information terminal 7. The touch panel 715 displays an image based on image data output from the processor 711 and also detects a touch position on the displayed image and outputs touched position information to the processor 711. As shown in FIG. 4, the information processing device 71 is installed on the cart 8 in such a position and direction that the customer moving around while pushing the cart 8 can view a display on the touch panel 715 and can perform a touch operation.

The speaker 716 plays a sound based on sound data output from the processor 711. The sound that is played back includes a confirmation sound, an alert warning sound or the like.

The reader 72 reads data recorded in a recording medium and outputs the read data to the processor 711. If the recording medium is a magnetic card, the reader 72 is a magnetic card reader. If the recording medium is a contact-type IC card, the reader 72 is an IC card reader. If the recording medium is an RFID (radio frequency identification) based system such as a contactless IC card or a smartphone, an RFID reader is used as the reader 72. The position of installation of the reader 72 on the cart 8 is not particularly limited. For example, the reader 72 may be installed by the side of the information processing device 71.

The camera 73 is provided on the cart 8 in such a way to be able to capture an image of a basket holder unit 81 of the cart 8 from above, such as shown in FIG. 4. The camera 73 is configured to monitor the basket holder unit 81 and the loading or removal of a merchandise item into or from a basket on the basket holder unit 81. In the camera 73, an LED (light-emitting diode) lamp 731 for illumination can be installed. The operating state of the camera 73 and the LED lamp 731 can be controlled by the processor 711 via the system transmission line 717. Two or more cameras 73 may be employed in some examples. For example, four cameras 73 may be arranged at the four sides or in four corners of the basket holder unit 81. Depending on the type of the camera 73 and the operating environment, sufficient ambient brightness may be secured and therefore the camera 73 may be used without requiring the LED lamp 731 in some examples.

The information terminal 7 may further optionally include a rotary beacon light 74, as indicated by a dashed line in FIG. 3, which is connected to the system transmission line 717 via an interface, or the like. The rotary beacon light 74 operating state is controlled by the processor 711. The rotary beacon light 74 is a lamp to give a warning to the customer using the cart 8 and to a salesclerk nearby.

Figure 5:
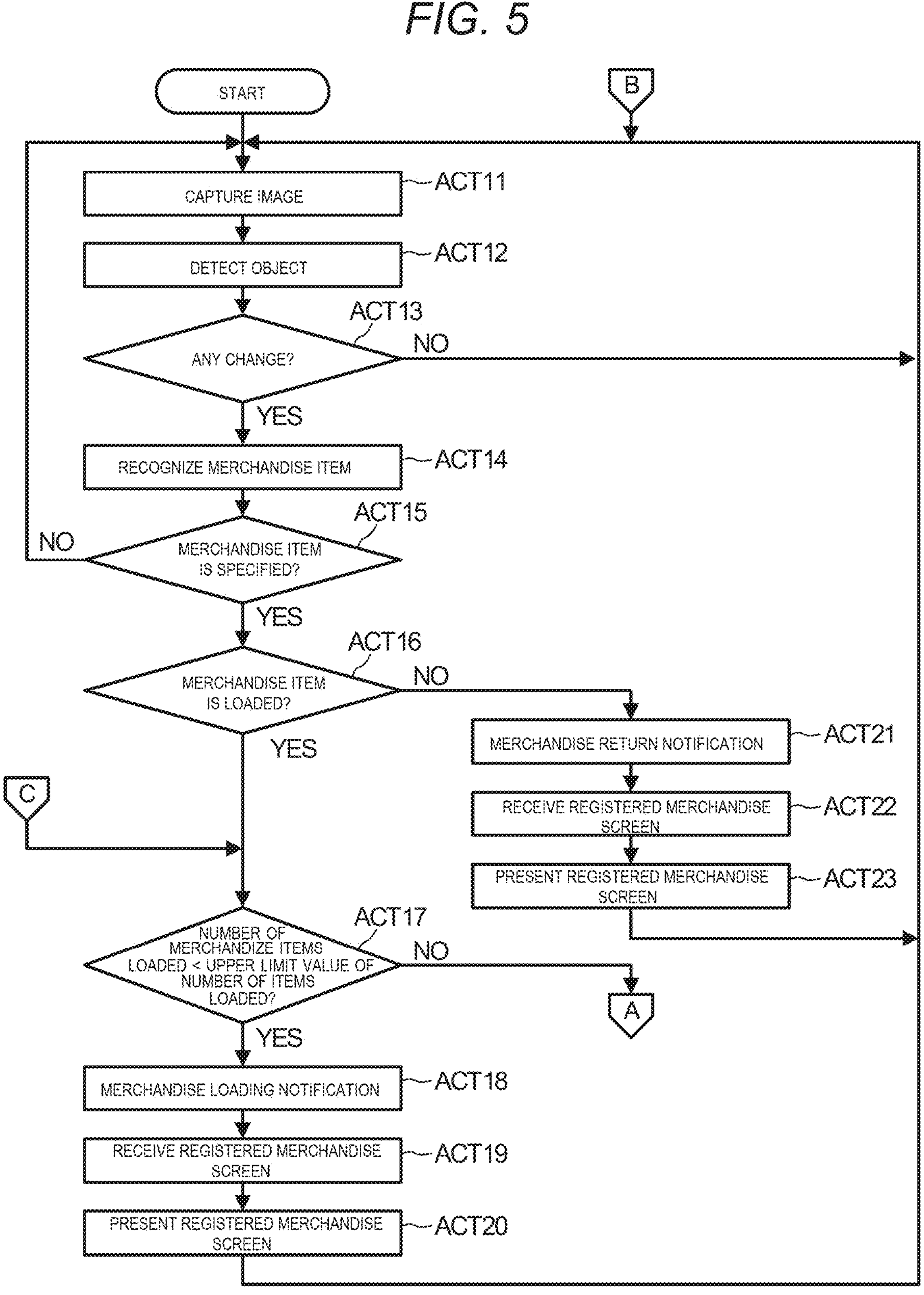
FIG. 5 shows a first part of a flowchart of information processing executed according to a terminal program by a processor of an information processing device in an information terminal.
Figure 6:
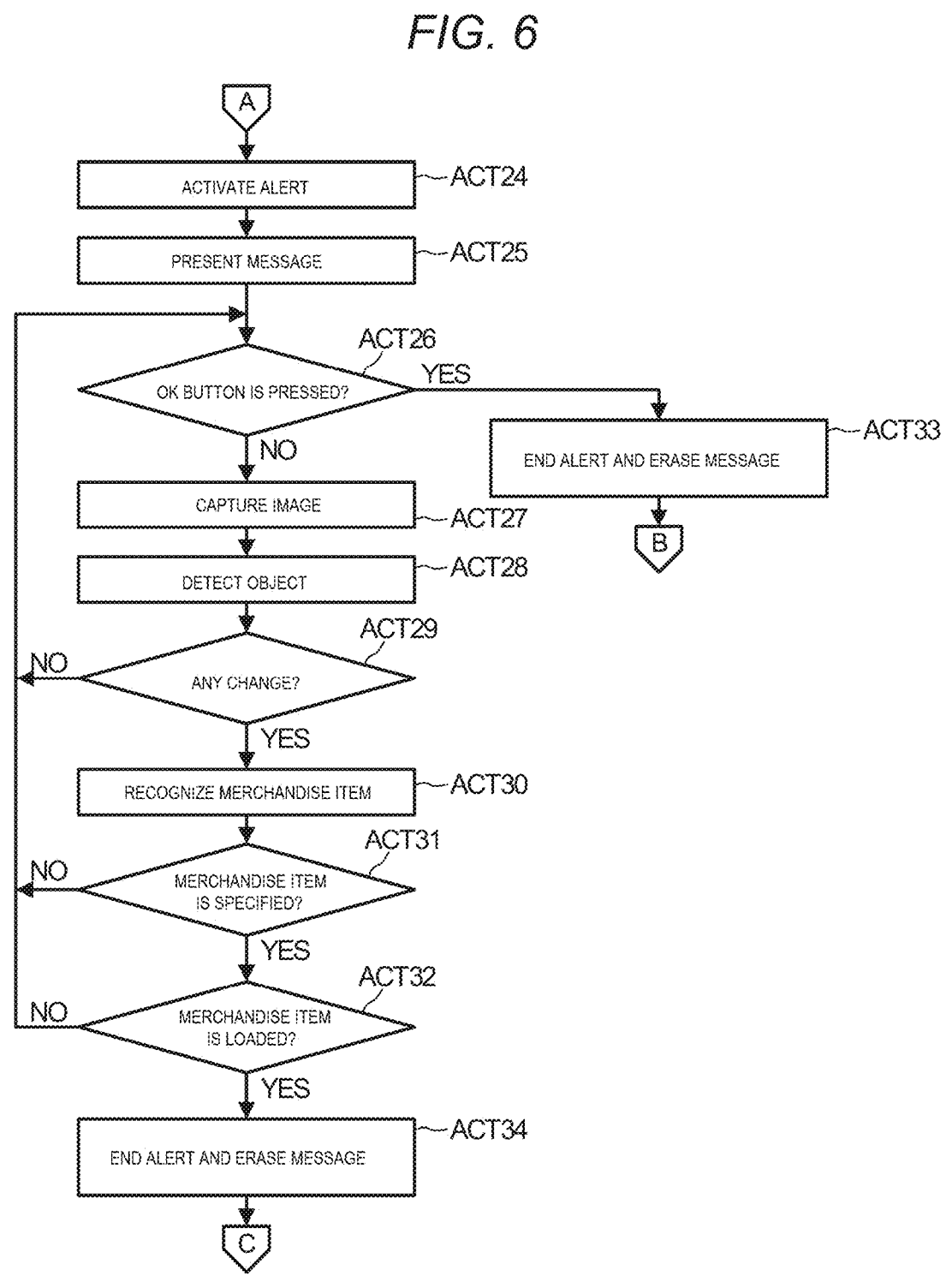

FIGS. 5 and 6 are flowcharts showing information processing executed by the processor 711 of the information processing device 71 of the information terminal 7 according to the terminal program 7131.

Certain aspects of the operations of the cart POS system 1 in the case where the customer performs procedures from the registration of a merchandise item to the settlement by self-service using the information terminal 7 on the cart 8, will now be described. The operations described below are non-limiting examples. The specific procedures adopted are not particularly limited, provided that similar results can be achieved. In this explanation, it is assumed the reader 72 has already read data recorded in a recording medium for a login and that the login has already been made. That is, the member ID read from the recording medium of the customer by the information terminal 7 is already stored in the member ID area 312 in the information terminal table 31 of the cart controller 3.

In ACT 11, the processor 711 of the information processing device 71 switches on the LED lamp 731 of the camera 73 and causes the camera 73 to capture an image. Image data corresponding to the captured image is stored in the main memory 712. In the main memory 712, an area to store the image data for a plurality of frames (multiple images in sequence) is provided. When storing new image data in this area, the processor 711 stores the new image data by erasing the oldest image data. Subsequently, the processor 711 proceeds to ACT 12.

In ACT 12, the processor 711 performs object detection on the latest image data stored in the main memory 712. Specifically, the processor 711 performs object detection to detect an merchandise item in the latest image in comparison to a previous image. In this process, the processor 711 sets a rectangular area (referred to as a bounding box) and attempts to detect the object in the image based on the learning data 7132 stored in the auxiliary memory device 713. The detected object and the detection position of this object in the image data are stored in the main memory 712 in correlation with the image data stored in the main memory 712. Subsequently, the processor 711 proceeds to ACT 13.

In ACT 13, the processor 711 compares the object and the detection position in the latest image data stored in the main memory 712 with an object and a detection position in previous image data and thus determines whether there has been any change or not. If a merchandise item is placed in the basket holder unit 81 or if merchandise is taken out of the basket holder unit 81, an image of the merchandise item that is being moved (for loading or return to shelf) is captured by the camera 73. Thus, when a merchandise item is loaded or returned, a difference is generated between the object and the detection position in the latest image data and the old image data. Therefore, the processor 711 can determine that there is a change. If it is determined that there is no change, the processor 711 gives NO in ACT 13 and proceeds to the foregoing ACT 11. However, if it is determined that there is a change, the processor 711 gives YES in ACT 13 and proceeds to ACT 14.

The image capture is generally repeated in a loop made up of the foregoing ACT 11, ACT 12, and ACT 13. Then, once there is any change in a captured image, the processor 711 proceeds to ACT 14.

In ACT 14, the processor 711 recognizes the merchandise item being moved in the image. Specifically, the processor 711 performs image recognition on the object in the bounding box, which was detected and stored in the main memory 712 in ACT 12, and identifies which merchandise item the detected moving object is, based on the learning data 7132 stored in the auxiliary memory device 713. Subsequently, the processor 711 proceeds to ACT 15.

In ACT 15, the processor 711 determines whether the merchandise item has been specified (identified) or not. If only a small part of the merchandise item is visible in the image, it may not be possible to identify the item. If it is determined that the merchandise item has not been specified, the processor 711 gives NO in ACT 15 and returns to ACT 11. In this embodiment, the angle of view of the camera 73, and the image capture cycle repeated in the loop made up of ACT 11, ACT 12, ACT 13 and the image capture cycle repeated in the loop made up of ACT 11, ACT 12, ACT 13, ACT 14, ACT 15, are set in such a way that at least one image showing the entirety of the merchandise item can be expected to be captured when the merchandise item with a prescribed maximum size is dropped in a free fall manner into the cart/basket. Of course, a configuration where the merchandise item is recognized after an image showing the entirety of the merchandise item can be formed by combination of a plurality of images together may be employed in some examples. If it is determined that the merchandise item has been specified, the processor 711 gives YES in ACT 15 and proceeds to ACT 16.

In ACT 16, the processor 711 determines whether the merchandise item has been loaded in the basket holder unit 81 or not. For example, based on the direction of movement of the merchandise item as shown in the latest image and the prior image(s), the processor 711 can determine whether the merchandise item has been put in or taken out. Alternatively, a weight scale or the like may be arranged at the bottom side of the basket holder unit 81 of the cart 8, and whether the merchandise item has been loaded or taken out can be detected based on whether the measured weight is increased or decreased. If it is determined that the merchandise item has been taken out, the processor 711 gives NO in ACT 16 and proceeds to ACT 21. However, if it is determined that the merchandise item has been loaded, the processor 711 gives YES in ACT 16 and proceeds to ACT 17.

In ACT 17, the processor 711 determines whether the number of merchandise items loaded (the number of merchandize items recognized and specified in the foregoing ACT 14) is less than the upper limit value stored as the number-of-items-loaded upper limit value data 71311 in the auxiliary memory device 713. In this embodiment, the upper limit value on the number of items which may be simultaneously loaded items is "2". That is, in ACT 17, whether two or more merchandise items have been simultaneously loaded or not is checked. If the number of merchandise items loaded is less than two (that is, if only one merchandise item is loaded) the merchandise item can be accurately recognized and specified. However, if two or more merchandise items are simultaneously loaded, the accuracy in specifying (identifying) the merchandise items drops significantly. Therefore, in ACT 17, the processor 711 checks whether the number of merchandise items loaded meets or exceeds the upper limit value for the number of simultaneously loaded items. As the number of merchandise items loaded, the number of bounding boxes set in the image used for image recognition, that is, the number of objects detected in ACT 12, can be used. If a plurality of merchandise items have been detected as loaded, the processor 711 gives NO in ACT 17 and proceeds to ACT 24. However, if it is determined that the number of merchandise items loaded is below the upper limit value (that is, in this example, if it is determined that only one merchandise item has been loaded) the processor 711 gives YES in ACT 17 and proceeds to ACT 18.

If it is determined in ACT 17 that only one merchandise item has been loaded, the processor 711 determines that the merchandise item has been accurately specified. Therefore, in this case, in ACT 18, the processor 711 causes the wireless unit 714 to transmit a merchandise loading notification to the cart controller 3 via the access point 4. The merchandise loading notification can include the terminal ID specifically allocated to the information terminal 7 including this information processing device 71, and the merchandise code indicating the merchandise item recognized and specified in ACT 14. Subsequently, the processor 711 proceeds to ACT 19.

The cart controller 3 having received the merchandise loading notification registers the loaded merchandise item. That is, the cart controller 3 inquires of the store server 2 for merchandise information matching the merchandise code included in the merchandise loading notification, and acquires the merchandise information stored in the merchandise database 21 (managed by the store server 2). The cart controller 3 then adds and stores the acquired merchandise information as new merchandise-item-to-be-purchased data in the merchandise-item-to-be-purchased data area 313 in the information terminal table 31 matching the terminal ID included in the merchandise loading notification. The cart controller 3 then generates a registered merchandise screen to report the registered merchandise item and transmits the registered merchandise screen to information terminal 7.

In ACT 19, the wireless unit 714 receives the registered merchandise screen transmitted from the cart controller 3 via the access point 4. Subsequently, the processor 711 proceeds to ACT 20.

In ACT 20, the processor 711 causes the touch panel 715 to present the received registered merchandise screen to the customer using the cart 8. Subsequently, the processor 711 returns to ACT 11.

In this way, if one merchandise item is loaded in the basket holder unit 81 of the cart 8, the information terminal 7 specifies (based on image recognition) what the merchandise item is and transmits a merchandise loading notification including the merchandise code for the specified merchandise item to the cart controller 3, and thus can cause the cart controller 3 to register this merchandise item as a merchandise item to be purchased.

If it is determined in ACT 16 that the merchandise item has been taken out, the processor 711 in ACT 21 causes the wireless unit 714 to transmit a merchandise return notification to the cart controller 3 via the access point 4. The merchandise return notification can include the terminal ID allocated to the information terminal 7 and the merchandise code indicating the merchandise item recognized and specified in ACT 14. Subsequently, the processor 711 proceeds to ACT 22.

The cart controller 3 having received the merchandise return notification deletes the returned merchandise item from the registered merchandise items to be purchased. That is, the cart controller 3 deletes the merchandise-item-to-be-purchased data matching the merchandise code included in the merchandise return notification from the merchandise-item-to-be-purchased data area 313. The cart controller 3 then generates a registered merchandise screen to report the registered merchandise item based on the merchandise-item-to-be-purchased data stored in the merchandise-item-to-be-purchased data area 313, and transmits the registered merchandise screen to the information terminal 7.

In ACT 22, the wireless unit 714 receives the registered merchandise screen transmitted from the cart controller 3 via the access point 4. Subsequently, the processor 711 proceeds to ACT 23.

In ACT 23, the processor 711 causes the touch panel 715 to present the received registered merchandise screen to the customer using the cart 8. Subsequently, the processor 711 returns to ACT 11.

In this way, if a merchandise item is taken out of the basket holder unit 81, the information terminal 7 identifies what this merchandise item (based on the image recognition) and transmits a merchandise return notification including a merchandise code to the cart controller 3, and thus can cause the cart controller 3 to delete this merchandise item from the merchandise items to be purchased. Generally, returned merchandise items are taken out and returned to the store shelf one by one. Therefore, the determination of the number of items as in the loading of a merchandise item does not necessarily need to be performed. Of course, in some examples, the determination of the number of items may also be performed for returning of a merchandise item or items.

If it is determined in ACT 17 that the number of merchandise items loaded is equal to or greater than the upper limit value for simultaneously loaded items (that is, if it is determined that multiple merchandise items have been loaded) the processor 711 activates an alert in ACT 24. The technique for activating or indicating the alert is not particularly limited. For example, the LED lamp 731 for illumination installed in the camera 73 may be made to flash on and off, or a particular reporting sound may be played via the speaker 716. Alternatively, both of these techniques may be employed. If the cart 8 has the rotary beacon light 74, the rotary beacon light 74 may be switched on, instead of or along with these techniques. Subsequently, the processor 711 proceeds to ACT 25.

In ACT 25, the processor 711 causes the touch panel 715 to present a message prompting the customer using the cart 8 to load the merchandise items again (that is, remove the item(s) and load again one at a time). This message is displayed, for example, superimposed on the registered merchandise screen displayed on the touch panel 715. It is desirable that the presented message prompting the customer to load the merchandise items again designates a specific action, for example, "Remove the just loaded merchandise items. After removal, press the OK button and then load the merchandise items one by one" or the like. The processor 711 causes the touch panel 715 to display an image of the OK button along with the message prompting the customer to remove and reload the merchandise items. Subsequently, the processor 711 proceeds to ACT 26.

In ACT 26, the processor 711 determines whether the OK button displayed on the touch panel 715 has been pressed or not. That is, the processor 711 determines whether the customer has touched a position corresponding to the image of the OK button displayed on the touch panel 715. When the customer has touched the position corresponding to the image of the OK button, the processor 711 determines that the OK button has been pressed. After it is determined that the OK button has been pressed, the processor 711 determines YES in ACT 26 and proceeds to ACT 33. If it is determined that the OK button has not yet been pressed, the processor 711 determines NO in ACT 26 and proceeds to ACT 27.

In ACT 27, as in ACT 11, the processor 711 causes the camera 73 to capture an image and stores image data of the captured image in the main memory 712. Subsequently, the processor 711 proceeds to ACT 28.

In ACT 28, as in ACT 12, the processor 711 performs object detection on a merchandise item moving within the image based on the latest image data stored in the main memory 712. The detected object and the detection position of this object in the image data are stored in the main memory 712 in correlation with the image data stored in the main memory 712. Subsequently, the processor 711 proceeds to ACT 29.

In ACT 29, as in ACT 13, the processor 711 compares the object and the detection position in the latest image data stored in the main memory 712 with an object and a detection position in previous image data and thus determines whether there is any change or not. If it is determined that there is no change, the processor 711 gives NO in ACT 29 and returns to ACT 26. However, if it is determined that there is a change, the processor 711 gives YES in ACT 29 and proceeds to ACT 30.

In ACT 30, as in ACT 14, the processor 711 recognizes and specifies the merchandise item moving within the image. Next, the processor 711 proceeds to ACT 31.

In ACT 31, as in ACT 15, the processor 711 determines whether the merchandise item has been specified or not. If it is determined that the merchandise item has not been specified, the processor 711 gives NO in ACT 31 and returns to ACT 26. If it is determined that the merchandise item has been specified, the processor 711 gives YES in ACT 31 and proceeds to ACT 32.

In ACT 32, as in ACT 16, the processor 711 determines whether the merchandise item has been loaded in the basket holder unit 81 or not. If it is determined that the merchandise item has been loaded (placed in the basket on cart 8), the processor 711 gives YES in ACT 32 and proceeds to ACT 34. However, if it is determined that the merchandise item has been taken out (removed from the basket on cart 8), the processor 711 gives NO in ACT 32 and proceeds to the foregoing ACT 26.

It may be a reasonable assumption that the determination in ACT 32 that a merchandise item has been taken out was generated by the action of the customer taking out of the incorrectly loaded merchandise items in response to the message presented on the touch panel 715 or the like. In general, the probability that a different merchandise item may be taken out in response to such a message or notification is low. Therefore, the processor 711 in this example returns to ACT 26 without transmitting a merchandise return notification to the cart controller 3 as was the case with the foregoing ACT 21. After removing the merchandise item, the customer presses the OK button in response to a predetermined message presented on the touch panel 715. Thus, the processor 711 determines that the OK button has been pressed in ACT 26 and proceeds to ACT 33.

In ACT 33, the processor 711 ends the activation of the alert (such as the flashing of the LED lamp 731) and also erases the message prompting the customer to reload the merchandise items again presented on the touch panel 715. Subsequently, the processor 711 returns ACT 11 and repeats the determination operations regarding the loading or taking out of another merchandise item.

The determination in ACT 32 that the merchandise item has been loaded is assumed to mean in this context that the customer has taken out the plurality of incorrectly loaded merchandise items in response to a predetermined message presented on the touch panel 715 but has not yet pressed the OK button but has reloaded the taken-out merchandise items. Therefore, in this case, in ACT 34, the processor 711 ends the activation of the alert such as the flashing of the LED lamp 731 and also erases the message prompting the customer to load the merchandise items again, presented on the touch panel 715. Subsequently, the processor 711 proceeds to ACT 17 and performs the determination regarding the number of merchandise items simultaneously loaded. In this way, the registration and deletion of the merchandise item to be purchased is performed. At the time of payment, the processor 711 can shift to payment processing in response to a press on a payment button in a merchandise registration screen. The payment processing is not necessarily an operation specifically related to a merchandise recognition system according to an embodiment and therefore will be only briefly described. In the payment processing, the processor 711 may generate a barcode based on the terminal ID allocated to the information terminal 7 and causes the touch panel 715 to display the barcode. A payment machine 5 may then read the generated barcode and transmit a transaction inquiry command including the terminal ID (in the barcode) to the cart controller 3. The cart controller 3 generates settlement data based on the merchandise-item-to-be-purchased data registered in the merchandise-item-to-be-purchased data area 313 in the information terminal table 31 corresponding to the terminal ID and sends back the settlement data to the payment machine 5. The payment machine 5 receives the settlement data. The payment machine 5 executes settlement for the merchandise item(s) to be purchased based on the provided settlement data.

If the cart POS system 1 is configured as a system in which settlement by electronic money is available, the processor 711 may cause the wireless unit 714 to transmit an electronic settlement command including the terminal ID to the cart controller 3 via the access point 4. The cart controller 3 generates settlement data based on the merchandise-item-to-be-purchased data registered in the merchandise-item-to-be-purchased data area 313 in the information terminal table 31 corresponding to the terminal ID included in the electronic settlement command and transmits the settlement data along with the member ID stored in the member ID area 312 in the information terminal table 31 to the store server 2. The store server 2 acquires the electronic money user ID from the member settlement record in a member settlement database based on the member ID sent along with the settlement data, and executes the settlement based on the settlement data with the electronic money center EMC using this electronic money user ID.

As described above, in the merchandise recognition system according to this embodiment, the camera 73 of the information terminal 7 functions as an image pickup unit provided on the cart 8. The processor 711 in the information processing device 71 of the information terminal 7 functions as: a specifying unit that identifies a merchandise item loaded into the cart 8 based on an image acquired by the camera 73, the specifying unit uses AI-based image recognition; and a reporting unit that gives an alert indicating that the accuracy of identification of the specified merchandise item is low by the LED lamp 731 and/or the speaker 716 or by the rotary beacon light 74 (if the information terminal 7 has the rotary beacon light 74) when the number of merchandise items included in the image acquired by the camera 73 exceeds a prescribed upper limit number stored as the number-of-items-loaded upper limit value data 71311.

In this way, in the merchandise recognition system according to this embodiment, if the identification accuracy of a merchandise item drops significantly, a report to that effect can be given to the user loading the merchandise item in the cart 8. Thus, the user receiving this report can temporarily take out the merchandise item and then reload the merchandise item into the cart 8 again in order to have the merchandise item specified correctly or more accurately. Therefore, a merchandise recognition system that enables merchandise registration with high reliability using AI-based image recognition can be provided.

The report given by the processor 711 (the reporting unit) can include a message that is displayed by the touch panel 715 provided in the information processing device 71. The message may prompt the user to take out merchandise items loaded beyond the upper limit number from the cart 8, and reload merchandise items again without exceeding the upper limit number.

Thus, the user using the cart 8 can understand what to do and can perform an operation indicated by the message. The camera 73 repeatedly acquires an image. The processor 711 functioning as the specifying unit starts specifying the merchandise item whenever there is a change between the sequential images acquired by the camera 73.

Thus, when the camera 73 captures an image of an already specified merchandise item and multiple merchandise items are contained in the basket holder unit 81 (or the basket placed in the basket holder unit 81), there will be no change in the images acquired in time series and therefore the already specified merchandise item is not specified again.

The touch panel 715 functions as an operation unit that accepts an OK button press operation as a confirmation operation by the user using the cart 8. The processor 711 functioning as the reporting unit ends the report including the alert and message when the touch panel 715 has received the OK button press operation.

Thus, the report can be ended in response to the confirmation operation by the user after a merchandise item specified with the low accuracy is taken out, and the merchandise item that has been taken out can be loaded again can be the specifying started again.

The processor 711 (functioning as the reporting unit) also ends the report including the alert and message when a merchandise item is specified again after the start of the report.

Thus, in the case where the user has forgotten to perform a confirmation operation after taking out a merchandise item with a low specifying accuracy, and has loaded the taken-out merchandise item again, the report can be ended and the continuation of the report can be prevented if the merchandise item is specified again.

The prescribed upper limit number to decide whether the processor 711 (functioning as the reporting unit) gives the report or not is "1" in this example.

Thus, the processor 711 can give a report whenever multiple merchandise items are simultaneously loaded and the image depicts the multiple merchandise items, that is, when a plurality of merchandise items are simultaneously loaded and the accuracy of specifying each merchandise item is considered to drop significantly.

The processor 711 also functions as a specified merchandise notification unit that transmits a merchandise code indicating a specified merchandise item to the outside.

Thus, if the merchandise recognition system according to this embodiment is applied to a cart POS system 1, the cart controller 3 having received this merchandise code can register the specified merchandise item as a merchandise item to be purchased.

In this case, if the processor 711 (functioning as the reporting unit) gives the notification that merchandise items beyond the upper limit number have been simultaneously load, the processor 711 (functioning as the specified merchandise notification unit) does not transmit the merchandise code of the specified merchandise item.

Thus, since the merchandise code of the merchandise item with a low specifying accuracy is not transmitted, the wrong merchandise item can be prevented from being registered as a merchandise item to be purchased.

In the merchandise recognition system according to this embodiment, the processor 711 (functioning as the specifying unit) can not only identify a merchandise item loaded in the cart 8 but also can identify a merchandise item taken out of the cart 8 based on the image(s) acquired by the camera 73. Then, the processor 711 (functioning as the specified merchandise notification unit) transmits a merchandise code indicating this identified taken-out merchandise item to the outside.

Thus, if the merchandise recognition system according to this embodiment is applied to the cart POS system 1, the cart controller 3 having received this merchandise code can delete the merchandise item from the merchandise items to be purchased by the user.

Second Embodiment

In the first embodiment, the information terminal 7 executes the recognition of a merchandise item. However, in the second embodiment, the cart controller 3 executes the recognition of a merchandise item.

A cart POS system according to this second embodiment includes a store server 2, a cart controller 3, an access point 4, a plurality of payment machines 5, a network 6, and a plurality of information terminals 7, each including an information processing device 71, as in the first embodiment. This second embodiment differs from the first embodiment in the configuration and operation of the cart controller 3 and the information processing device 71 of the information terminal 7. In the description below, aspects substantially similar to that in the first embodiment are not described further, and differences from the first embodiment are mainly described.

Figure 7:
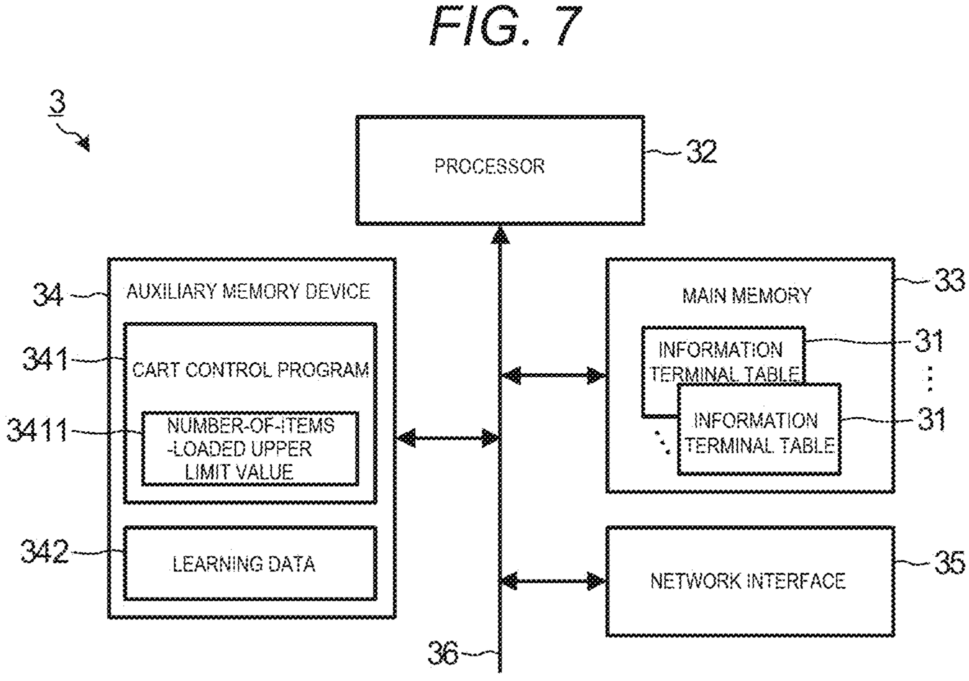
FIG. 7 is a block diagram of a mobile controller according to a second embodiment.

FIG. 7 is a block diagram showing a configuration of the cart controller 3 according to the second embodiment. The cart controller 3 has a processor 32, a main memory 33, an auxiliary memory device 34, a network interface 35, and a system transmission line 36. The system transmission line 36 includes an address bus, a data bus, a control signal line, or the like. In the cart controller 3, the processor 32, the main memory 33, the auxiliary memory device 34, and the network interface 35 are connected to the system transmission line 36. In the cart controller 3, the processor 32, the main memory 33, the auxiliary memory device 34, and the system transmission line 36 connecting these components together form a computer.

The processor 32 controls each part in order to implement various functions as the cart controller 3 according an operating system or an application program. The processor 32 is, for example, a CPU but may also be implemented in various other forms including an integrated circuit such as an AI chip, a GPU, an ASIC, an FPGA, or a DSP.

The main memory 33 includes a non-volatile memory area and a volatile memory area. The main memory 33 includes a non-volatile memory area such as a ROM, and a volatile memory area such as a RAM. In the volatile memory area, information terminal tables 31 corresponding respectively to the information terminals 7 as described in the first embodiment are stored.

For example, an EEPROM, an HDD, or an SSD or the like can be the auxiliary memory device 34. In this embodiment, the auxiliary memory device 34 saves a cart control program 341 to cause the cart controller 3 to execute a merchandise registration function using the information terminal 7, as an application program. The cart control program 341 includes number-of-items-loaded upper limit value data 3411 prescribing an upper limit value of the number of merchandise items that are simultaneously loaded, similar to the number-of-items-loaded upper limit value data 71311 described in the first embodiment. The cart control program 341 may be stored in the main memory 33. The auxiliary memory device 34 also stores learning data 342 about each merchandise item put on sale at the store that is stored in the merchandise database 21 of the store server 2, similar to the learning data 7132 in the first embodiment. This learning data 342 may be a copy of the learning data 211 included in the merchandise database 21 of the store server 2, as in the first embodiment. Since the cart controller 3 stores the number-of-items-loaded upper limit value data 3411 and the learning data 342, the information processing device 71 of the information terminal 7 need not store the number-of-items-loaded upper limit value data 71311 and the learning data 7132.

The network interface 35 is an interface for the network 6. The processor 32 can cause the network interface 35 to transmit and receive data to and from the store server 2, the access point 4, and the payment machine 5 via the network 6.

Figure 8:
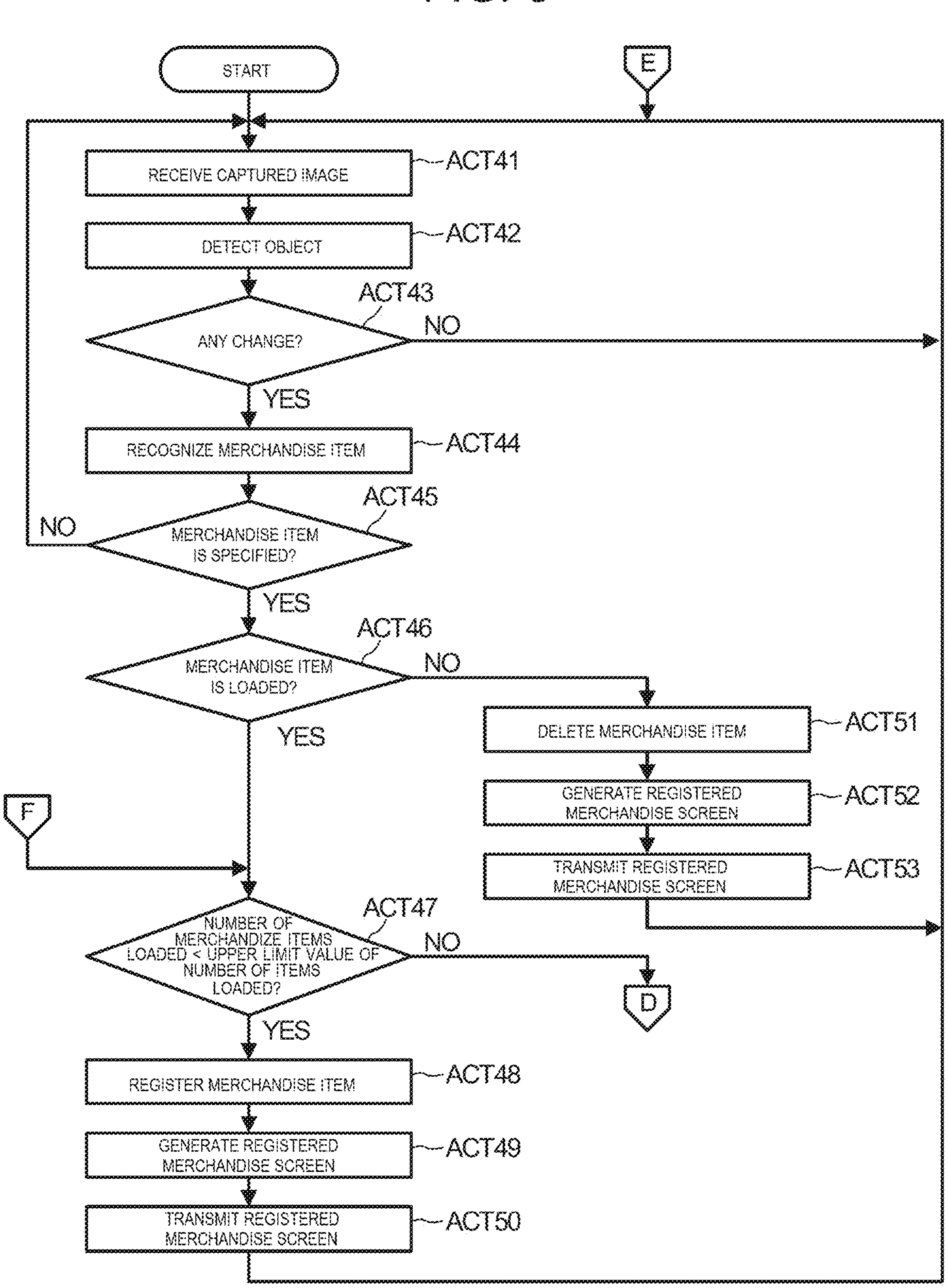
FIG. 8 shows a first part of a flowchart of information processing executed according to a cart control program by a processor of a mobile controller.
Figure 9:
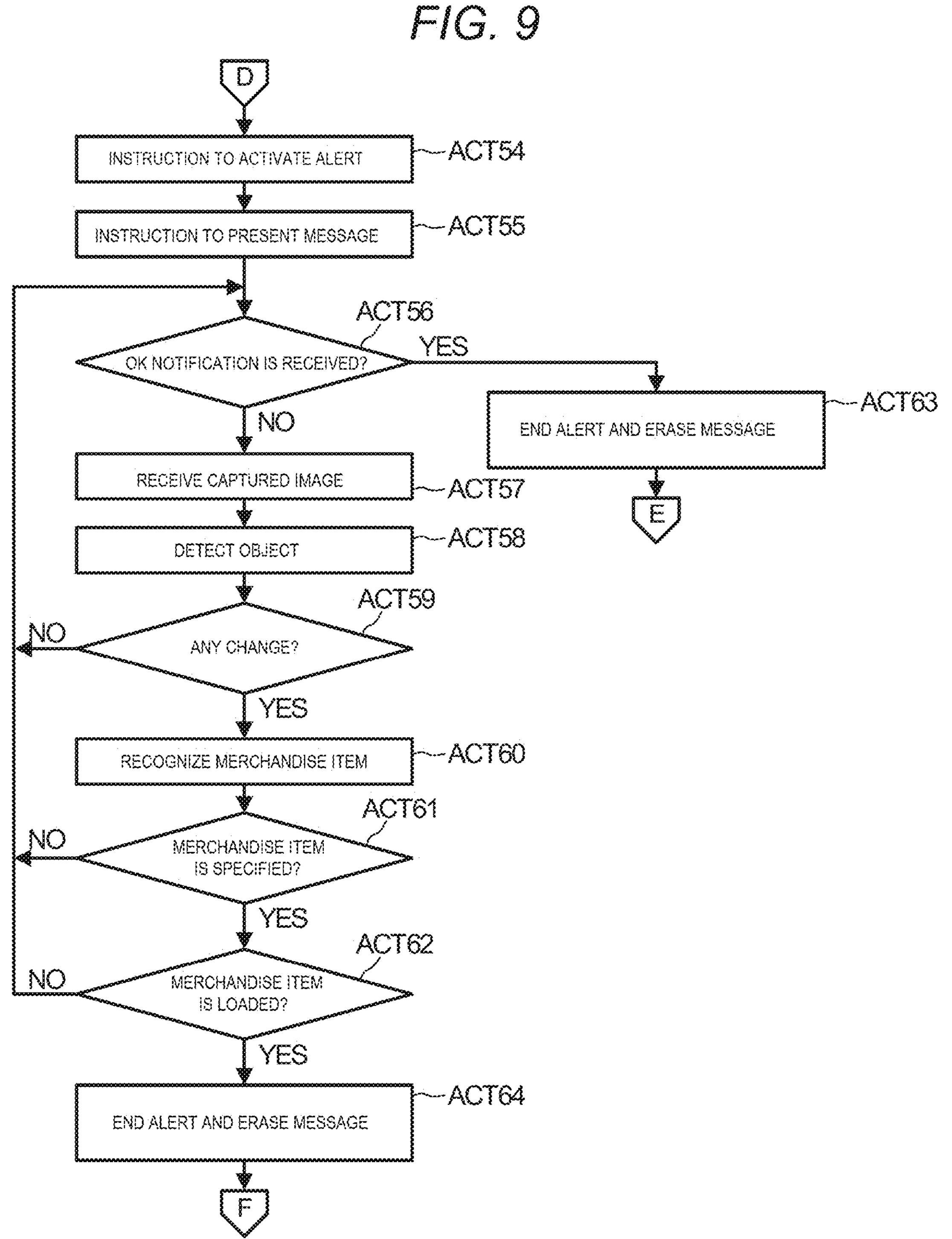
FIG. 9 shows a second part of the flowchart of information processing executed according to a cart control program by a processor of a mobile controller.

FIGS. 8 and 9 are flowcharts showing information processing executed by the processor 32 of the cart controller 3 according to the cart control program 341. These flowcharts show processing procedures associated with handling one information terminal 7. The processor 32 executes similar processing for each of the plurality of information terminals 7 in parallel or the like.

Operations of the cart POS system 1 when the customer performs the registration of a merchandise item to be purchased to the settlement by self-service using the information terminal 7 on the cart 8 will now be described using these flowcharts. The particular operations described below are an example. The procedures are not particularly limited, provided that substantially similar results can be achieved. It is also assumed in the following that the reader 72 of the information terminal 7 has already read data recorded in a recording medium and that a user (customer) login has already been made. That is, a member ID read from the recording medium of the customer by the information terminal 7 is already stored in the member ID area 312 in the information terminal table 31 of the cart controller 3.

In ACT 41, the network interface 35 of the cart controller 3 receives image data of a captured image transmitted from the information terminal 7 via the access point 4. As described in the first embodiment, the information terminal 7 switches on the LED lamp 731 of the camera 73 and causes the camera 73 to capture an image. The information terminal 7 then transmits image data of the captured image to the cart controller 3. The processor 32 stores the received image data in the main memory 33. In the main memory 33, an area to store the image data for a plurality of frames is secured. When storing new image data in this area, the processor 32 stores the new image data by erasing the oldest image data. Next, the processor 32 proceeds to ACT 42.

In ACT 42, the processor 32 performs object detection on a merchandise item moving within the latest image data stored in the main memory 33. The detected object and the detection position of this object in the image data are stored in the main memory 33 in correlation with the image data stored in the main memory 33. Next, the processor 32 proceeds to ACT 43.

In ACT 43, the processor 32 compares the object and the detection position in the latest image data stored in the main memory 33 with an object and a detection position in previous image data and thus determines whether there is any change or not. If it is determined that there is no change, the processor 32 gives NO in ACT 43 and returns to ACT 41. However, if it is determined that there is a change, the processor 32 gives YES in ACT 43 and proceeds to ACT 44.

The image data transmitted from the information terminal 7 is received and whether there is any change or not is repeatedly checked in a loop made up of ACT 41, ACT 42, and ACT 43. Then, if there is any change in the image, the processor 32 proceeds to ACT 44.

In ACT 44, the processor 32 recognizes the merchandise item moving within the image. Specifically, the processor 32 performs image recognition on the object in the bounding box which was detected and stored in the main memory 33 in ACT 42, and identifies which merchandise item the object is based on the learning data 342 stored in the auxiliary memory device 34. Subsequently, the processor 32 proceeds to ACT 45.

In ACT 45, the processor 32 determines whether the merchandise item has been specified or not. If it is determined that the merchandise item has not been specified, the processor 32 gives NO in ACT 45 and returns to ACT 41. If it is determined that the merchandise item has been specified, the processor 32 gives YES in ACT 45 and proceeds to ACT 46.

In ACT 46, the processor 32 determines whether the merchandise item has been loaded in the basket holder unit 81 of the cart 8. For example, based on the direction of movement of the merchandise item as shown in the latest image and the past image, the processor 32 can determine whether the merchandise item has been loaded or taken out. If it is determined that the merchandise item has been taken out (not loaded), the processor 32 gives NO in ACT 46 and proceeds to ACT 51. However, if it is determined that the merchandise item has been loaded, the processor 32 gives YES in ACT 46 and proceeds to ACT 47.

In ACT 47, the processor 32 determines whether the number of merchandise items loaded (the number of merchandize items recognized and specified in the foregoing ACT 44) is less than the upper limit value for simultaneously loaded items as stored as the number-of-items-loaded upper limit value data 3411 in the auxiliary memory device 34. In this second embodiment, the upper limit value for simultaneously loaded items is again set to “2”. As the number of merchandise items loaded, the number of bounding boxes set in the image used for image recognition, that is, the number of objects detected in ACT 42, can be used. If it is determined that the number of merchandise items loaded is equal to or greater than the upper limit value (that is, if it is determined that multiple merchandise items have been loaded), the processor 32 gives NO in ACT 47 and proceeds to ACT 54. However, if only one merchandise item has been loaded, the processor 32 gives YES in ACT 47 and proceeds to ACT 48.

If it is determined in ACT 47 that the number of merchandise items loaded is below the upper limit value, the processor 32 determines that the merchandise item has been accurately specified. Therefore, in ACT 48, the processor 32 registers the merchandise item recognized and specified in ACT 44. That is, the processor 32 inquires of the store server 2 for merchandise information based on the merchandise code of the specified merchandise item and acquires the merchandise information stored in the merchandise database 21 managed by the store server 2. The processor 32 then adds and stores the acquired merchandise information as new merchandise-item-to-be-purchased data in the merchandise-item-to-be-purchased data area 313 in the corresponding information terminal table 31. Subsequently, the processor 32 proceeds to ACT 49.

In ACT 49, the processor 32 generates a registered merchandise screen to report the registered merchandise item, based on the merchandise-item-to-be-purchased data stored in the merchandise-item-to-be-purchased data area 313 in the corresponding information terminal table 31. Subsequently, the processor 32 proceeds to ACT 50.

In ACT 50, the processor 32 causes the network interface 35 to transmit the generated registered merchandise screen to the corresponding information terminal 7 via the access point 4 and causes the touch panel 715 of the information terminal 7 to display the registered merchandise screen. Subsequently, the processor 32 returns to ACT 41.

In this way, if a single merchandise item is loaded in the basket holder unit 81, the cart controller 3 can specify what the merchandise item is based on the image recognition of the image captured by the camera 73 of the information terminal 7, and thus can register this merchandise item as a merchandise item to be purchased.

If it is determined in ACT 46 that the merchandise item has been taken out, the processor 32 in ACT 51 deletes the merchandise item from the registered merchandise items to be purchased. That is, the processor 32 deletes the merchandise-item-to-be-purchased data of the merchandise item recognized and specified in ACT 44 and stored in the merchandise-item-to-be-purchased data area 313. Subsequently, the processor 32 proceeds to ACT 52.

In ACT 52, the processor 32 generates a registered merchandise screen to report the registered merchandise item, based on the merchandise-item-to-be-purchased data stored in the merchandise-item-to-be-purchased data area 313 in the corresponding information terminal table 31. Subsequently, the processor 32 proceeds to ACT 53.

In ACT 53, the processor 32 causes the network interface 35 to transmit the generated registered merchandise screen to the corresponding information terminal 7 via the access point 4 and causes the touch panel 715 of the information terminal 7 to display the registered merchandise screen. Subsequently, the processor 32 returns to ACT 41.

In this way, if a merchandise item is taken out of the basket holder unit 81, the cart controller 3 can identify what the merchandise item is based on the image recognition of the image captured by the camera 73 of the information terminal 7, and thus can delete this merchandise item from the merchandise items to be purchased.

If it is determined in ACT 47 that the number of merchandise items loaded is equal to or greater than the upper limit value, the processor 32 in ACT 54 causes the network interface 35 to give an instruction to activate an alert for the information terminal 7 via the access point 4. Subsequently, the processor 32 proceeds to ACT 55. The information terminal 7 having received the instruction to activate the alert, for example, causes the LED lamp 731 for illumination installed in the camera 73 to flash on and off, or plays back a particular reporting sound via the speaker 716. Alternatively, if the cart 8 has a rotary beacon light 74, the rotary beacon light 74 is switched on, instead of or along with these techniques.

In ACT 55, the processor 32 causes the network interface 35 to give the information terminal 7 an instruction to present a message prompting the customer to load the merchandise items again, via the access point 4. Subsequently, the processor 32 proceeds to ACT 56. The information terminal 7 having received the instruction to present a message prompting the customer to load the merchandise items again causes the touch panel 715 to present the message prompting the customer to load the merchandise items again and an image of an OK button, to the customer using the cart 8. The message and the image of the OK button are displayed, for example, superimposed on the registered merchandise screen displayed on the touch panel 715. Instead of giving the instruction to present the message prompting the customer to load the merchandise items again, the processor 32 may generate a registered merchandise screen with the message and the image of the OK button superimposed thereon, transmit this registered merchandise screen to the information terminal 7, and cause the touch panel 715 to display the registered merchandise screen.

In ACT 56, the processor 32 determines whether the network interface 35 has received an OK notification transmitted from the information terminal 7 via the access point 4. The OK notification is transmitted from the information terminal 7 when the OK button displayed on the touch panel 715 is pressed. If it is determined that the OK notification has been received, the processor 32 gives YES in ACT 56 and proceeds to ACT 63. However, if it is determined that the OK notification has not been received, the processor 32 gives NO in ACT 56 and proceeds to ACT 57.

In ACT 57, as in ACT 41, the network interface 35 receives image data of a captured image transmitted from the information terminal 7 via the access point 4. Subsequently, the processor 32 proceeds to ACT 58.

In ACT 58, as in ACT 42, the processor 32 performs object detection of a merchandise item moving within the latest image data stored in the main memory 33. The detected object and the detection position of this object in the image data are stored in the main memory 33 in correlation with the image data stored in the main memory 33. Subsequently, the processor 32 proceeds to ACT 59.

In ACT 59, as in ACT 43, the processor 32 compares the object and the detection position in the latest image data stored in the main memory 33 with an object and a detection position in prior image data and thus determines whether there is any change or not. If it is determined that there is no change, the processor 32 gives NO in ACT 59 and returns to ACT 56. However, if it is determined that there is a change, the processor 32 gives YES in ACT 59 and proceeds to ACT 60.

In ACT 60, as in ACT 44, the processor 32 recognizes the merchandise item moving within the image. Subsequently, the processor 32 proceeds to ACT 61.

In ACT 61, as in ACT 45, the processor 32 determines whether the merchandise item has been specified or not. If it is determined that the merchandise item has not been specified, the processor 32 gives NO in ACT 61 and returns to ACT 56. If it is determined that the merchandise item has been specified, the processor 32 gives YES in ACT 61 and proceeds to ACT 62.

In ACT 62, as in ACT 46, the processor 32 determines whether the merchandise item has been loaded in the basket holder unit 81 or not. If it is determined that the merchandise item has been loaded, the processor 32 gives YES in ACT 62 and proceeds to ACT 64. However, if it is determined that the merchandise item has been taken out (not loaded), the processor 32 gives NO in ACT 62 and returns to ACT 56.

In ACT 63, the processor 32 causes the network interface 35 to send an instruction to end the activation of the alert and erase the presented message to the corresponding information terminal 7 via the access point 4. Subsequently, the processor 32 returns to ACT 41 and repeats the foregoing determination operation about the loading or taking out of the next merchandise item. The information terminal 7 having received this instruction to erase the message erases the message prompting the customer to reload the merchandise items again that was presented on the touch panel 715. Instead of giving the instruction to erase the message, the processor 32 may generate a registered merchandise screen where the message and the image of the OK button have been erased, transmit this registered merchandise screen to the information terminal 7, and cause the touch panel 715 to display the registered merchandise screen.

In ACT 64, the processor 32 causes the network interface 35 to send an instruction to end the activation of the alert and erase the presented message via the access point 4. Subsequently, the processor 32 returns to ACT 47 and performs the foregoing determination about the number of merchandise items loaded. The information terminal having received this instruction to erase the message erases the message prompting the customer to load the merchandise items again from touch panel 715. Instead of giving the instruction to erase the message, the processor 32 may generate a registered merchandise screen where the message and the image of the OK button have been erased, transmit this registered merchandise screen to the information terminal 7, and cause the touch panel 715 to display the registered merchandise screen.

In this way, the registration and deletion of the merchandise item to be purchased is performed.

As described above, in the merchandise recognition system according to this second embodiment, the processor 32 of the cart controller 3 in the cart POS system 1 functions as a specifying unit t that causes the network interface 35 to communicate with the information terminal 7, acquires an image acquired by the camera 73 of the information terminal 7, and specifies a merchandise item loaded in the cart 8 based on the image (specifically, using AI-based image recognition); and a reporting unit that causes the network interface 35 to communicate with the information terminal 7 and gives an alert indicating that the accuracy of specifying the specified merchandise item is low by the LED lamp 731 installed in the camera 73 and/or the speaker 716 and/or by a rotary beacon light 74 (if the information terminal 7 has a rotary beacon light 74), whenever the number of merchandise items included in the image acquired by the camera 73 exceeds a prescribed upper limit number stored as the number-of-items-loaded upper limit value data 3411.

In this way, if the identification accuracy based on an image of a merchandise item drops significantly, a report to that effect can be given to the user loading the merchandise item in the cart 8. Thus, the user receiving this report can temporarily take out the merchandise item(s) and then load the merchandise item in the cart 8 again in order to have the merchandise item specified correctly. Therefore, a merchandise recognition system that enables merchandise registration with higher reliability using an AI-based image recognition method can be provided.

The report given by the processor 32 (functioning as the reporting unit) can include a message that is outputted by the touch panel 715 provided in the information processing device 71 and that prompts the user to take out merchandise items loaded beyond the upper limit number from the cart 8, and load the merchandise items again in a number not exceeding the upper limit number.

Thus, the user using the cart 8 knows what to do and can perform an operation as indicated by the message.

The camera 73 functioning as the image pickup unit repeatedly acquires an image. The processor 32 functioning as the specifying unit starts specifying the merchandise item whenever there is a change between the images acquired by the camera 73 over time.

Thus, even if the camera 73 captures an image of an already specified merchandise item when multiple merchandise items are already contained in the basket holder unit 81 of the cart 8 (or a basket placed in the basket holder unit 81) there will generally be no change in the images acquired in time series and therefore the already specified merchandise item is not specified again.

The touch panel 715 functions as an operation unit that accepts an OK button press operation, which is a confirmation operation by the user using the cart 8. The processor 32 functioning as the reporting unit ends the report including the alert and message after the network interface 35 has received an OK notification indicating that the touch panel 715 has accepted the OK button press operation.

Thus, the report can be ended in response to the confirmation operation by the user after a merchandise item with the low accuracy of specifying is taken out, and the specifying of the merchandise item that has been taken out can be started again when reloaded into the cart 8.

The processor 32 functioning as the reporting unit also ends the report including the alert and message when a merchandise item is specified after the start of the report.

Thus, in the case where the user has forgotten to perform a confirmation operation after taking out a merchandise item but has loaded the taken-out merchandise item again, the report can be ended and the continuation of the report can be prevented, if the merchandise item that is loaded again is correctly specified.

The present disclosure is not limited the above-described example embodiments.

For example, while the start of the merchandise recognition in ACT 14 and ACT 44 can be triggered by the occurrence of a change in the image, this is not limiting. For example, one or more sensors that, optically detects an object is present in the field of view of the camera 73 may be arranged at any position on the cart 8, and the merchandise recognition may be started in response to the detection by such a sensor of an object loaded in or taken out of the cart 8.

The determination about whether the merchandise item has been loaded or taken out in ACT 16 and ACT 46 is not limited to a determination based on an image. For example, a weight scale may be arranged at the bottom side of the basket holder unit 81 of the cart 8, and whether the merchandise item has been loaded or taken out can be determined based on whether the measured weight is increased or decreased.

If such determination about whether the merchandise item has been loaded or taken out based on the weight, is enabled, whether simultaneously loaded merchandise items have been taken out in response to the alert and message or not can be determined as well. Thus, if a merchandise item is additionally loaded without the previously simultaneously loaded merchandise items first being taken out, this can be reported to the salesclerk at this point or at the time of payment with the payment machine 5.

In the first embodiment, the terminal program 7131 is stored in advance in the auxiliary memory device 713 or the main memory 712 of the information terminal 7. In other examples, a terminal program may be provided separately from the information processing device 71 by download or subsequent installation. In the second embodiment, the cart control program 341 is stored in advance in the auxiliary memory device 34 or the main memory 33 of the cart controller 3. However, in other examples, a cart control program may be provided separately from the cart controller 3 by download or subsequent installation. The terminal program or the cart control program can be provided in a non-transitory, computer-readable, removable recording medium or via a network. The recording medium may be in any form that can store a program and that is readable by a computer device, such as a CD-ROM or a memory card.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A merchandise recognition system, comprising:

a touch panel display screen;

a storage device to store an item upper limit value for merchandise items being moved simultaneously, into a cart basket by a customer; and a processor configured to:

receive images of a cart basket area of the cart basket via an interface, recognize merchandise items being moved into the cart basket area in a received image, compare the item upper limit value to a number of merchandise items recognized as being moved at a same time into the cart basket area in the received image, and issue a limit notification when the number of merchandise items recognized as being moved at the same time into the cart basket area in the received image is greater than or equal to the item upper limit value, wherein the limit notification is sent to the touch panel display screen, and the limit notification causes the touch panel display screen to display:

a message prompting a user to remove the merchandise items just moved into the cart basket area and replace the merchandise items back into the cart basket area in different groups of merchandise items without equaling or exceeding the item upper limit value for any one of the different groups, and an input operation unit configured to accept a message confirmation from the user, the message is removed from the touch panel display screen if the input operation unit receives the message confirmation, and the message is removed from the touch panel display screen if the processor recognizes merchandise items being removed from the cart basket area in a received image after the message was displayed.

2. The merchandise recognition system according to claim 1, wherein the processor attempts to recognize merchandise items being moved at the same time into the cart basket area in the received image only after a change between images received in time sequence is detected.

3. The merchandise recognition system according to claim 1, further comprising:

a camera connected to the processor via the interface, the camera positioned to capture images of the cart basket area.

4. The merchandise recognition system according to claim 3, further comprising:

a cart including the cart basket area, wherein the processor is in an information processing device mounted on the cart.

5. The merchandise recognition system according to claim 1, further comprising:

a cart including the cart basket area, wherein the processor is in an information processing device mounted on the cart.

6. The merchandise recognition system according to claim 1, wherein the interface is a network interface, and the processor is in a server apparatus.

7. The merchandise recognition system according to claim 1, further comprising:

a cart including the cart basket area; and a camera mounted on the cart, wherein the interface is a network interface, and the processor is in a server apparatus separate from the cart.

8. The merchandise recognition system according to claim 1, wherein the processor recognizes merchandise items being moved into the cart basket area at the same time in the received image using artificial intelligence-based recognition using data stored in the storage device.

9. A cart-based point-of-sale terminal system providing image-based merchandise registration, the cart-based point-of-sale terminal system comprising:

a cart with a basket area for storing items to be purchased in a sales transaction;

a display screen on the cart for displaying information to a user of the cart;

a camera on the cart and positioned to image the basket area;

a storage device to store an item upper limit value for items being moved simultaneously into the basket area by the user; and a processor configured to:

receive images of the basket area from the camera, recognize items being moved at a same time into the basket area in a received image, compare the item upper limit value to a number of items recognized as being moved at the same time into the basket area in the received image, and issue a limit notification when the number of items recognized as being moved at the same time into the basket area in the received image is greater than or equal to the item upper limit value, wherein the display screen is a touch panel, the limit notification is sent to the display screen, and the limit notification causes the display screen to display:

a message prompting the user to remove the items just moved into the cart basket area and replace the items back into the cart basket area in different groups of items without equaling or exceeding the item upper limit value for any of the different groups, and an input operation unit configured to accept a message confirmation from the user;

the message is removed from the display screen if the input operation unit receives the message confirmation, and the message is removed from the display screen if the processor recognizes items being removed from the basket area in a received image after the message was displayed.

10. The cart-based point-of-sale terminal system according to claim 9, wherein the processor attempts to recognize items being moved at the same time into the basket area in the received image only after a change between images received in time sequence is detected.

11. The cart-based point-of-sale terminal system according to claim 9, wherein the processor is in an information processing device mounted on the cart.

12. The cart-based point-of-sale terminal system according to claim 9, further comprising:

a network interface, wherein the processor is in a server apparatus.

* * * * *